(12) United States Patent
Yang et al.

(10) Patent No.: US 11,373,322 B2
(45) Date of Patent: Jun. 28, 2022

(54) DEPTH SENSING WITH A RANGING SENSOR AND AN IMAGE SENSOR

(71) Applicant: STMicroelectronics, Inc., Coppell, TX (US)

(72) Inventors: Xiaoyong Yang, San Jose, CA (US); Chang Myung Ryu, San Jose, CA (US); James Kath, Danville, CA (US); Rui Xiao, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 196 days.

(21) Appl. No.: 16/727,792

(22) Filed: Dec. 26, 2019

(65) Prior Publication Data
US 2021/0201517 A1   Jul. 1, 2021

(51) Int. Cl.
*G06T 7/521*   (2017.01)

(52) U.S. Cl.
CPC .... *G06T 7/521* (2017.01); *G06T 2207/10028* (2013.01)

(58) Field of Classification Search
CPC ...................... G06T 7/521; G06T 2207/10028
See application file for complete search history.

(56) References Cited

U.S. PATENT DOCUMENTS

| | | | |
|---|---|---|---|
| 8,648,702 B2 | 2/2014 | Pala | |
| 8,908,157 B2 | 12/2014 | Eisele et al. | |
| 9,159,135 B2 | 10/2015 | Grossmann et al. | |
| 9,552,668 B2 * | 1/2017 | Yang | G06T 17/00 |
| 9,767,545 B2 * | 9/2017 | Koppal | G06T 5/50 |
| 10,225,543 B2 * | 3/2019 | Mullis | H04N 5/23232 |
| 10,334,705 B2 * | 6/2019 | Meerbeek | H05B 47/19 |
| 10,510,149 B2 * | 12/2019 | Cutu | G06T 7/174 |

(Continued)

FOREIGN PATENT DOCUMENTS

| | | |
|---|---|---|
| EP | 1241634 A2 | 9/2002 |
| EP | 2602640 A1 | 6/2013 |

(Continued)

OTHER PUBLICATIONS

Exclusive Architecture, "Autofocus Systems Part III," downloaded on Jan. 5, 2018, from http://www.exclusivearchitecture.com/?page_id=1332, 7 pages.

(Continued)

*Primary Examiner* — Gregory M Desire
(74) *Attorney, Agent, or Firm* — Seed IP Law Group LLP

(57) ABSTRACT

The present disclosure provides a device and method for depth sensing by utilizing the combination of a ranging sensor and an image sensor. The ranging sensor can accurately detect distance measurement from an object. The image sensor can take images with high resolution of the object. By combining each sensor data from the ranging sensor and the image sensor, accurate depth information with high resolution of the object may be obtained. A structured light having patterned shapes are used in conjunction with the ranging sensor to receive reflected patterned shapes of the object. These reflected patterned shapes are used to analyze distance measurements associated with the specific patterned shapes. These distance measurements from both the ranging sensor and the image sensor is aligned and combined to generate an accurate depth map with high resolution using a processor of an electronic device including the ranging sensor and the image sensor.

18 Claims, 7 Drawing Sheets

(56) References Cited

U.S. PATENT DOCUMENTS

| | | | |
|---|---|---|---|
| 2014/0111619 A1* | 4/2014 | Lee | G01B 11/2513 348/46 |
| 2014/0153816 A1 | 6/2014 | Cohen et al. | |
| 2015/0285625 A1 | 10/2015 | Deane | |
| 2016/0005179 A1* | 1/2016 | Petyushko | G06T 5/50 382/154 |
| 2016/0041266 A1 | 2/2016 | Smits | |
| 2016/0072258 A1* | 3/2016 | Seurin | H04N 13/204 348/46 |
| 2016/0088287 A1 | 3/2016 | Sadi et al. | |
| 2016/0291138 A1 | 10/2016 | Drader et al. | |
| 2016/0327639 A1 | 11/2016 | Albert et al. | |
| 2016/0327649 A1 | 11/2016 | Albert et al. | |
| 2018/0089848 A1 | 3/2018 | Yang et al. | |

FOREIGN PATENT DOCUMENTS

| | | |
|---|---|---|
| GB | 2485997 A | 6/2012 |
| WO | 03034361 A1 | 4/2003 |

OTHER PUBLICATIONS

Ivan, "Samsung's Dual Pixel auto focus explained and why it's the best out there right now," published online on Feb. 22, 2016, downloaded on Dec. 31, 2019, from https://www.gsmarena.com/samsungs_dual_pixel_tech_is_like_canons_dual_pixel_auto_focus-news-16805.php, 4 pages.

Koifman, "TechInsights Surveys PDAF Technologies," published online Jun. 15, 2017, downloaded on Jan. 5, 2018, from http://image-sensors-world.blogspot.com/2017/06/techinsights-surveys-pdaf-technologies.html, 2 pages.

Low, "Qualcomm's new depth-sensing camera is surprisingly effective," Published online Aug. 15, 2017, downloaded on Jan. 5, 2018, from https://www.engadget.com/2017/08/15/qualcomm-spectra-premium-computer-vision-depth-sensing-module/, 3 pages.

Mansurov, "How Phase Detection Autofocus Works," downloaded on Jan. 31, 2019, from https://photographylife.com/how-phase-detection-autofocus-works, 26 pages.

* cited by examiner

DEPTH SENSING WITH A RANGING SENSOR AND AN IMAGE SENSOR

BACKGROUND

Technical Field

The present disclosure is directed to generating depth information of an object in a field of view.

Description of the Related Art

Depth information has become important in many aspects of current technology. Some image sensors provide distance information with a captured image. The distance information being a distance from a lens of the sensor to an object, as an example. Applications of depth information extend to computer vision, machine learning, and artificial intelligence, among others. For example, depth sensing can be used in augmented reality (AR), virtual reality (VR), and environment mapping. Dual cameras have been used for depth sensing to obtain depth information. However, using multiple cameras can drive up the cost. Dual cameras also have problems, which include: a relatively high error rate (e.g., conventional dual cameras exhibit error rates around 10-30% which is high considering the industries standard), alignment issues, drift issues (e.g., voltage and thermal problems) and dead zone issues (e.g., dead zones created between cameras).

BRIEF SUMMARY

The present disclosure provides a cost effective, low power, and accurate solution for depth sensing by utilizing a combination of a ranging sensor and an image sensor. One example of the ranging sensor includes a time of flight (ToF) sensor which can accurately detect a distance from the sensor to an object or objects being imaged. The image sensor includes a sensor having a phase detection function, phase detect autofocus function, or similar functions. While the ToF sensor provides a relatively low resolution and an absolute depth map, the image sensor provides a relatively high resolution and a relative depth map. By combining sensor data from the ToF sensor and the phase information from the image sensor, accurate depth information with high resolution is obtainable.

In various embodiments, a light source having patterned shapes (e.g., a vertical-cavity surface-emitting laser (VCSEL) having a diffractive optical element (DOE) on the VCSEL) is used in conjunction with the ToF sensor. Patterned shapes are projected into a field of view of the ToF and the image sensor. Patterned shapes reflected from objects in the field of view are received using both an image from the image sensor and information received by the ToF. The ToF may include single-photon avalanche diodes (SPADs), which provide accurate depth information. The image sensor receives the shape information with relative depth information (phase information).

These reflected patterned shapes received with each sensor are indicative of one or more distance measurements associated with the specific patterned shapes. The patterned shapes provide alignment information to accommodate the differences in field of view between the image sensor and the ToF.

These distance measurements from both the ToF sensor and the image sensor are aligned and combined to generate an accurate depth map with high resolution using a processor of an electronic device including the ToF sensor and the image sensor. The patterned shapes reflected from the field of view of each sensor can be used with the depth information to create the accurate depth map.

BRIEF DESCRIPTION OF THE SEVERAL VIEWS OF THE DRAWINGS

Reference will now be made by way of example to the accompanying drawings. In the drawings, identical reference numbers identify similar elements or acts. In some drawings, however, different reference numbers may be used to indicate the same or similar elements. The sizes and relative positions of elements in the drawings are not necessarily drawn to scale. For example, the shapes of various elements and angles are not necessarily drawn to scale, and some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with time of flight sensors and phase detection sensors have not been shown or described in detail to avoid unnecessarily obscuring descriptions of the embodiments.

Unless the context indicates otherwise, throughout the specification and claims which follow, the word "comprise" and variations thereof, such as, "comprises" and "comprising" are to be construed in an open, inclusive sense that is as "including, but not limited to." Further, the terms "first," "second," and similar indicators of the sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

Figure 1A:
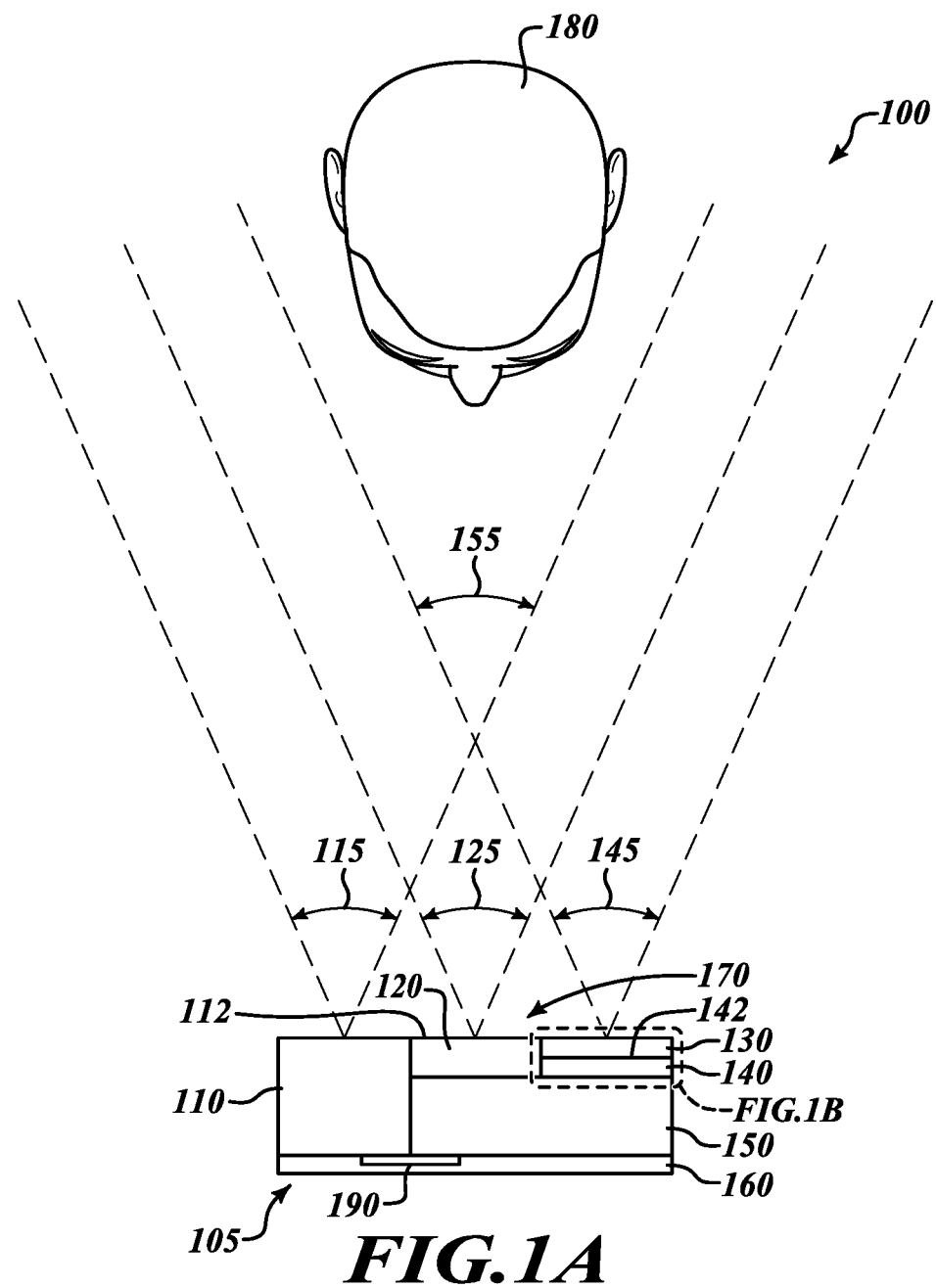
FIG. 1A is a top view illustrating an electronic device capable of receiving depth information using a combination of sensors, in accordance with one embodiment of the present disclosure.

FIG. 1A is a top view 100 illustrating an electronic device 105 capable of receiving depth information using a combination of sensors, in accordance with one embodiment of the present disclosure. The electronic device 105 incorporates sensors 110, 170 that receive distance information and capture images of an object 180 within a field of view. The term "distance information" used herein is broadly used to encompass information related to obtaining distance measurements, depth measurements, time information and any other suitable measurements in calculating distance or depth of an object within a field of view of the lens of the sensor. Based on the capabilities of each sensor, some sensors are suitable in obtaining substantially accurate distance measurement as compared to obtaining substantially accurate depth measurement. However, other sensors are suitable in obtaining substantially accurate depth measurement as compared to obtaining substantially accurate distance measurement. The distance measurement, for example, may refer to a measurement to an object in the field of view from a lens of a sensor. On the other hand, the depth measurement may refer to a relative measurement of various points within the object. The time information may include, for example, a time when the light is emitted from the sensor, a time when the reflected light from the object is received at the sensor, a time difference between when the light is emitted and received, and other suitable time information in calculating distance or depth of an object. In some embodiments, "data" and "information" may be used interchangeably.

The electronic device 105 includes an image sensor 110 adjacent to a ranging sensor 170. The image sensor 110 and the ranging sensor 170 are on a circuit board 160. An interposer, buffer, or support 150 is between the circuit board 160 and the ranging sensor 170 to align an environment facing surface 112 of both the image sensor and the ranging sensor. The circuit board 160 is connected to a processor 190 of the electronic device 105 to process the image data received from both the image sensor 110 and the ranging sensor 160. Various arrangements are contemplated. The arrangement will include overlapping fields of view 115, 125, 145 which is indicated with reference numeral 155.

The electronic device 105 may be a single package or assembled together during assembly of a consumer product, such as mobile phones, cellular phones, tablet computers, digital cameras, video cameras, laptop or notebook computers or the like. The electronic device 105 may include the processor 190 within the device, such as a microprocessor, application-specific integrated circuit (ASIC), or other suitable processing circuitry. Alternatively or additionally, the electronic device 105 may be coupled to additional electronic components for data and image processing purposes.

The image sensor 110 includes a phase detection sensor function, phase detection autofocus sensor function, or other suitable phase detection and autofocusing methods and devices. For example, a phase detection (PD) method may include dividing the received light into pairs of images (e.g., a first image and a second image) and comparing the first and second images. The two images are then analyzed for similar light intensity patterns such as peaks and valleys and separation error is calculated in order to find whether the object is in front focus or back focus position. This gives the direction and an estimate of the required amount of movement for focusing.

The image sensor 110 has the field of view (FOV) 115, which is an observable range or angle of an environment available to be captured by the image sensor. The image sensor 110 captures, records, or otherwise stores images of the environment within the field of view 115. The FOV allows for coverage of an area rather than a single focused point. Further, in use, the image sensor 110 receives reflected structured light from the object 180 within the field of view 115, the structured light coming from a lens of a patterned structure 130 included in the ranging sensor 170. In one embodiment, the image sensor 110 or associated processing circuitry (such as a processor programmed with an algorithm) has the capability of searching, identifying the reflected structured light and extracting information included in the structured light. The structured light and the various patterns associated with the structured light will be explained in detail hereinafter.

The ranging sensor 170 is positioned on the circuit board 160 adjacent to the image sensor 110. In one embodiment, the ranging sensor 170 includes distance sensors and processing circuitry capable of detecting and measuring a distance or distances from the ranging sensor 170 to an object or objects in the fields of view 125, 145 of the ranging sensor.

These distance sensors may be any suitable sensors capable of measuring distance, such as a plurality of single photon avalanche diodes (SPADs) coupled to processing circuitry, which may be in a single package or multiple packages. In FIG. 1A, the ranging sensor 170 includes a time of flight (ToF) sensor having a receiver 120, the patterned structure 130, and a light emitting source 140. The receiver 120 is spaced from the circuit board 160 by the buffer 150. The patterned structure 130 and the light emitting source 140 are adjacent to the receiver 120 and spaced from the image sensor by the receiver 120. The patterned structure 130 is spaced from the buffer 150 by the light emitting source 140.

In one embodiment, the light emitting source 140 is a vertical-cavity surface-emitting laser (VCSEL). The VCSEL is a type of semiconductor laser diode with laser beam emission perpendicular from a top surface 142 of the VCSEL. However, in other embodiments, any suitable light emitting source may be used including semiconductor lasers (e.g., vertical-external-cavity surface-emitting-laser (VECSEL), hybrid silicon laser interband cascade laser (ICL), semiconductor ring laser or the like). The light emitting source 140 has a field of view 145 that can emit light to an object within the range or angle of the field of view 145. In one embodiment, the VCSEL is the source for generating structured light using the patterned structure 130 or a lens having a plurality of patterns through which the light is emitted.

In one embodiment, the patterned structure 130 includes a diffractive optical element (DOE) 195, such as a lens. The DOE 195 is overlain or otherwise integrated with the light emitting source 140 so that in use, the light exiting the DOE 195 is structured light having patterns or shapes projected into the field of view 155. The patterns may be any kind of shapes or sizes. When the VCSEL emits light from the top surface 142, the light is filtered using the DOE 195, emitting structured light having patterned shapes onto any object in the field of view 145. In one or more embodiments, the DOE 195 is a part of the patterned structure 130 as a single structure. However, in other embodiments, the DOE 195 may be a separate component that is arranged on the patterned structure 130. The receiver 120 captures data about the environment in the field of view 125 with the plurality of sensors of the receiver 120. From the data captured during each capturing time period, the ranging sensor 170 can output depth or distance information about the object in the field of view 155.

The processor 190 can evaluate the data captured by the receiver 120 to identify these patterned shapes from the structured light and associate the patterned shapes with distances reflected from the object 180. The functionality of the receiver 120 will be detailed hereinafter.

For any object that is within the field of view 115 of the image sensor and the fields of view 125, 145 of the ranging sensor 170, e.g., an overlapping portion 155 of the fields of view, the data captured by the image sensor 110 and the ranging sensor 170 together can be processed to provide accurate depth information. Objects in this overlapping portion 155 of the field of views will receive the structured light or patterns emitted from the patterned structure 130 of the ranging sensor 170.

The image sensor 110 in conjunction with the associated processor identifies the patterned shapes along with the related phase detect data to create the accurate depth map. The calculation of the distance associated with the patterned shapes will be explained in detail in connection with FIGS. 2A-4B.

In one embodiment, the receiver 120 includes a plurality of SPAD arrays. The SPAD arrays exhibit high sensitivity and precise timing response. Due to this feature, the SPAD arrays are capable of determining ToF optical pulses reflected by an object and accurately measuring the distance from the object. In ToF sensors incorporating multiple zones, receiving multiple distance measurements is also possible which allows fast and precise depth map determination. The SPAD arrays together have the field of view 125 that receives the structured light reflected by the object. In some embodiments, the SPAD arrays receive the reflected structured light and identifies, analyzes the patterned shapes to extract distance information related to the patterned shapes.

In one or more embodiments, the buffer 150 is an electrical interface connecting the ranging sensor 170, the circuit board 160 and the image sensor 110. In one embodiment, the circuit board 160 includes a printed circuit board or a flexible cable. In other embodiments, the circuit board 160 includes any suitable board capable of connecting electronic circuitry or electronic components. The ranging sensor 170, buffer 150 and the image sensor 110 are mounted on the circuit board 160.

The circuit board 160 can provide connection with various components of the electronic device including the processor 190 that receives the sensed data from the various sensors and calculates the distance and depth measurements based on the sensed data to generate a depth map. A depth map is a data structure that contains information relating to the distance of the surfaces of an object (or objects) from a viewpoint (e.g., lens of a sensor) and the distance of the object (or objects) from the viewpoint. In one embodiment, the depth map can be generated based on the image containing a depth value which is included in the depth information and a distance value which is included in the distance information. The information in the image contains a depth value between the various points in the object being captured. For example, if a face of a person is being captured, the relative depth of the nose with respect to the ears is included in the depth map. The depth map generated based on the present disclosure includes a combination of distance information, including one or more distance measurement/values, determined based on information from the ranging sensor 170, and depth information, including one or more depth measurement/values, determined based on information from the image sensor 110. Further details of creating a depth map based on the combination of distance information and depth information will be explained in connection with FIGS. 3A, 3B, 4A, and 4B.

Figure 1B:
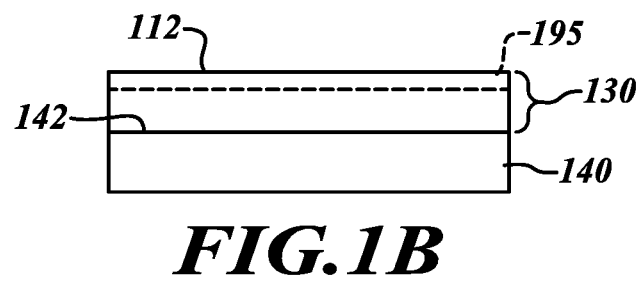
FIG. 1B is an enlarged view illustrating a diffractive optical element included in the patterned structure being overlain on a light emitting source, in accordance with one embodiment of the present disclosure.

FIG. 1B is an enlarged view illustrating a diffractive optical element 195 included in the patterned structure 130 being overlain on a light emitting source 140, in accordance with one embodiment of the present disclosure. The patterned structure 130 including the DOE 195 is on the top surface 142 of the light emitting source 140. The DOE 195 is positioned along the environment facing surface 112 such that the light passing through the DOE 195 will have patterned shapes when radiated from the ranging sensor 170.

Figure 2A:
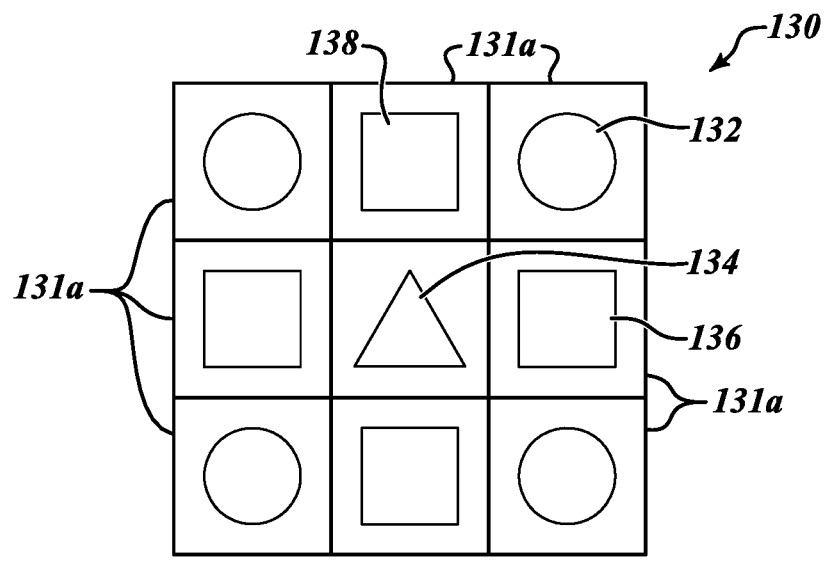
FIG. 2A is a representation of a ranging sensor with patterned shapes, in accordance with one embodiment of the present disclosure.

FIG. 2A is a representation of the patterned structure 130 with patterned shapes, in accordance with one embodiment of the present disclosure. The representation of the patterned structure 130 shows an array of zones 131A. Each zone of the array is associated with distance information which will be detailed later on. While other numbers and sizes of a representation of the patterned structure 130 can be used, in FIG. 2A, an exemplary 3×3 array of zones 131A is illustrated for the purpose of explaining the embodiment. The zone is a division or a section of a layout as perceived by the ranging sensor 170.

As discussed above, the ranging sensor 170 emits structured light with patterned shapes by overlaying the patterned structure 130 over the light emitting source 140. Each zone 131A of the patterned structure 130 has a patterned shape associated with that zone. The patterned shapes as shown in FIG. 2A include a circle 132, a triangle 134, a first square 136, and a second square 138. In one embodiment, these patterned shapes are physical shapes of the patterned structure 130. However, in another embodiment, these patterned shapes may be virtual shapes that are perceived by the ranging sensor 170. In one embodiment, the patterned shapes can all differ from each other. In other embodiments, the patterned shapes can all be of the same shape. In further embodiments, some of the patterned shapes can have the same shapes and the rest of the patterned shapes can have the different shapes. Even though some patterned shapes may be identical shapes, the same shapes are located in different zones.

The SPAD arrays in the receiver 120 of the ranging sensor 170 receives the reflected structured light. After the structured light hits the object 180 and is returned back to the SPAD array, each of the patterned shapes will be associated with a distance measurement. The image sensor 110 which also receives the reflected structured light will detect the patterned shapes and extract a depth measurement associated with the patterned shapes. As previously explained, the ranging sensor 170 is capable of producing an absolute depth map due to its accuracy in obtaining distance information. However, the ranging sensor 170 will have a low resolution compared to a general image sensor. On the other hand, the image sensor 110 is capable of producing a relative depth map, but generally does not produce an absolute depth map due to its relative inaccuracy in obtaining precise distance information. In one example, the image sensor 110 provides a high resolution image with a relative depth map information associated with the patterned shapes from the reflected structured light.

Figure 2B:
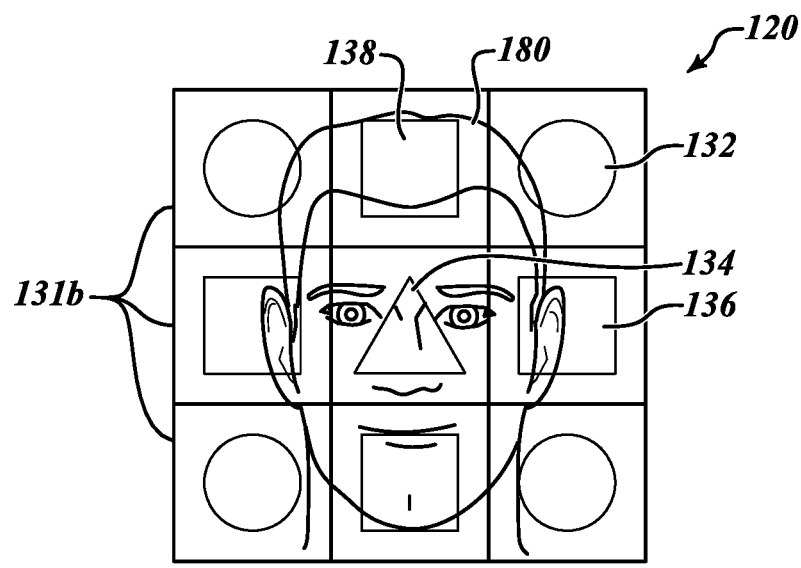
FIG. 2B is a representation of the ranging sensor with patterned shapes shown in FIG. 2A with an object, in accordance with one embodiment of the present disclosure.

FIG. 2B is a representation of the receiver 120 of the ranging sensor 170 with patterned shapes shown in FIG. 2A with an object, in accordance with one embodiment of the present disclosure. In FIG. 2B, the receiver 120 includes a 3×3 array of zones 131B, corresponding to the zones 131A of the patterned structure 130, with an object 180 is shown.

When the receiver 120 of the ranging sensor 170 receives the patterned shapes of the structured light reflected by the object 180 (e.g., here a face of a human), the 3×3 array of the receiver 120 relays the sensed information to the processor 190 to determine the distance information of each zone that is associated with a patterned shape.

For example, when the structured light is emitted toward the object 180 through the patterned structure 130 having patterned shapes 132, 134, 136, 138, the receiver 120 senses the reflected structured light after the light hits the object 180. The reflected structured light is received at the receiver 120 having the plurality of zones 131B. Each zone 131B includes one or more SPAD arrays for acquiring distance information for that particular zone associated with the particular patterned shape. The zone 131B receiving the triangle patterned shape 134 is reflected from the nose portion of the object 180. The zone 131B receiving the triangle shape 134 receives reflected structured light associated with the triangle shape 134 from the perspective of that zone 131. The SPAD arrays of the zone 131B configured to receive structured light having triangle shape 134 will receive the light and the timing information associated with the received light. The processor 190 receives this information from the receiver 120 to determine the distance between the ranging sensor 170 and the nose portion of the object 180. The structured light reflected from the object 180 and received at the zone 131B having a square shape 136 will be received and calculated by the processor 190 to produce the distance between the ranging sensor 170 and the left ear portion of the object 180. Similarly, the structured light reflected from the object 180 and received at the zone 131B having a circle shape 132 will be received and calculated by the processor 190 to produce the distance between the ranging sensor 170 and the left head portion of the object 180. The structured light reflected from the object 180 and received at the zone 131 having a square shape 138 will be received and calculated by the processor 190 to produce the distance between the ranging sensor 170 and the forehead portion of the object 180.

The first square 136 and the second square 138 have the same square shapes but are located in different zones. Because the SPAD arrays positioned in each zone obtains distance information of the object 180 from the perspective of that zone, the patterned shapes can either have same shapes or different shapes.

Figure 3A:
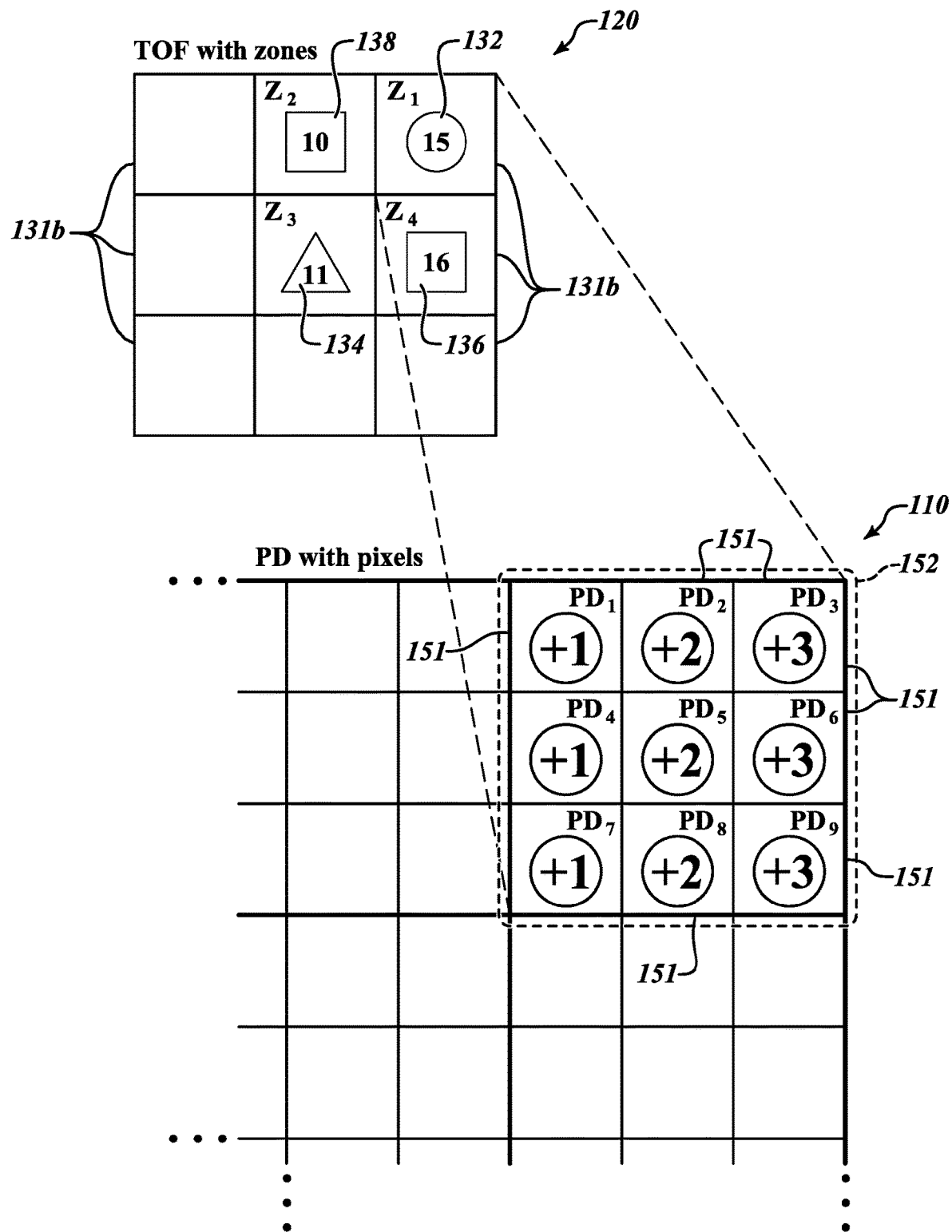
FIG. 3A is a representation of the ranging sensor showing distance information associated with each of the patterned shapes reflected from the object, and a plurality of pixels of an image sensor showing distance information associated with a specific patterned shape reflected from the object, in accordance with one embodiment of the present disclosure.

FIG. 3A is a representation of the ranging sensor showing distance information associated with each of the patterned shapes reflected from the object, and a plurality of pixels of an image sensor showing distance information associated with a specific patterned shape reflected from the object, in accordance with one embodiment of the present disclosure.

As shown in the figure, when the receiver 120 of the ranging sensor 170 receives the reflected patterned shapes of the structured light, the processor 190 computes the distance information of each zone that is associated with a patterned shape.

Here, for example, the zone 131B having a triangle 134 receives a triangle patterned shape of the structured light reflected from the object 180. That is, zone 131B having a triangle 134 (e.g., $Z_3$) of the receiver 120 detects and identifies a triangle patterned shape of the structured light. The processor 190 can further determine distance measurements associated with this triangle patterned shape by calculating how the triangle patterned shapes warp over the object 180 and the distance between points. In the exemplary figure, the zone 131 having a triangle 134 is associated with a distance value 11 between the ranging sensor 170 and the nose portion of the object 180. This distance value 11 is an absolute distance measurement output from the processor 190 of the device 105 for that particular triangle shape 134 in that zone $Z_3$. As explained previously, the ranging sensor 170 has the capability of obtaining an absolute distance measurement for each zone associated with a particular shape. Similar operations are performed by the receiver 120 of the ranging sensor 170 and the processor 190 for the other patterned shapes. The zone 131 having a square 136 (e.g., $Z_4$) is associated with a distance value 16 between the ranging sensor 170 and the left ear portion of the object 180. The zone 131 having a circle 132 (e.g., $Z_1$) is associated with a distance value 15 between the ranging sensor 170 and the left head portion of the object 180. The zone 131 having a square 138 (e.g., $Z_2$) is associated with a distance value 10 between the ranging sensor 170 and the forehead portion of the object 180. The exemplary distance measurements used here indicate that the circle 132 associated with a distance value 15 is closer than the square 136 having distance value 16, but is farther than the triangle 134 having distance value 11. Here, the farther the distance, the larger the value. However, in other embodiments, the distance value can be expressed in a different manner. For example, the smaller distance value can be indicative of a farther distance.

In the bottom of FIG. 3A is an array of pixels 151 of the image sensor 110 where only a part of the array is shown for simplicity. The array of pixels 151 of the image sensor 110 includes a plurality of subarrays corresponding respectively to the zones, and each pixel includes phase information. For example, the subarray 152 corresponds to zone 131B having a circle shape 132 (e.g., $Z_1$). In one embodiment, the size of zone may be substantially the same as to the size of the corresponding subarray. However, in other embodiments, the size of the zone of the receiver 120 of the ranging sensor 170 can be of different size than the corresponding subarray in the image sensor 110. The processor 190 can combine the absolute distance measurement obtained from the ranging sensor 170 with the absolute depth measurement obtained from the image sensor 110 even when the size of the zone does not match with the size of the corresponding subarray. Phase information, in one embodiment, indicates the absolute depth information acquired from the image sensor 110.

As previously explained, one embodiment of the image sensor 110 is a phase detection feature or sensor, which generates absolute depth map information (e.g., relative distance measurements of the object but absolute depth measurements of the various points and surfaces within the object) contrary to the ranging sensor 170 which calculates absolute distance information (e.g., accurate distance measurements from the object but relative depth measurements of the various points and surfaces within the object). Each subarray 152 of pixels 151 of the array of pixels of the image sensor 110 corresponds to one of the zones of the receiver 120 in the ranging sensor 170.

Here, the 3×3 sub-array 152 of the array of pixels of the image sensor 110 includes nine pixels 151, with each pixel having circle patterned shapes therein. The subarray 152 corresponds to a zone, for example $Z_1$, having circle patterned shape 132 of the receiver 120 of the ranging sensor 170. In one or more embodiments, the 3×3 array of the ranging sensor 170 corresponds in size with a 9×9 array of pixels 151 of the image sensor 110. That is, in this example, each zone 131B of the ranging sensor 170 corresponds to the size of a 3×3 subarray 152 of the image sensor 110.

The image sensor 110 which has a higher resolution than the ranging sensor 170 has further distance information associated with the object 180. For example, the distance information of $Z_1$ of the ranging sensor 170 is of the distance measurement from the ranging sensor 170 to the left head portion of the object 180. The image sensor 110 is capable of measuring the absolute depth information of the object 180 with higher resolution and detailed depth values of the object 180. For example, the depth value of pixels of the image sensor, namely, phase detect pixel values $PD_1$, $PD_4$, $PD_7$, have the depth value of +1. The pixels of the PD sensor, $PD_2$, $PD_5$, $PD_8$, have the depth value of +2. The pixels of the PD sensor, $PD_3$, $PD_6$, $PD_9$, have the depth value of +3. Because the image sensor 110 is capable of obtaining high resolution relative depth values compared to accurate distance information, the phase detect pixel values represent accurate depth information of the object. In one embodiment, the depth value associated with each pixel illustrates accurate or absolute depth information of the object 180 with respect to its neighboring pixels. For example, the depth value of $PD_2$ indicating +2 means that it is closer than $PD_3$ which has a greater depth value of +3. On the other hand, $PD_2$ is farther than $PD_1$ which has a smaller depth value of +1. This relative depth value information, while it does not provide an exact distance information from the image sensor 110 to the object 180, provides a high resolution image which will later be combined with the sensed data of the ranging sensor 170. This will be explained in connection with the coming figures.

Figure 3B:
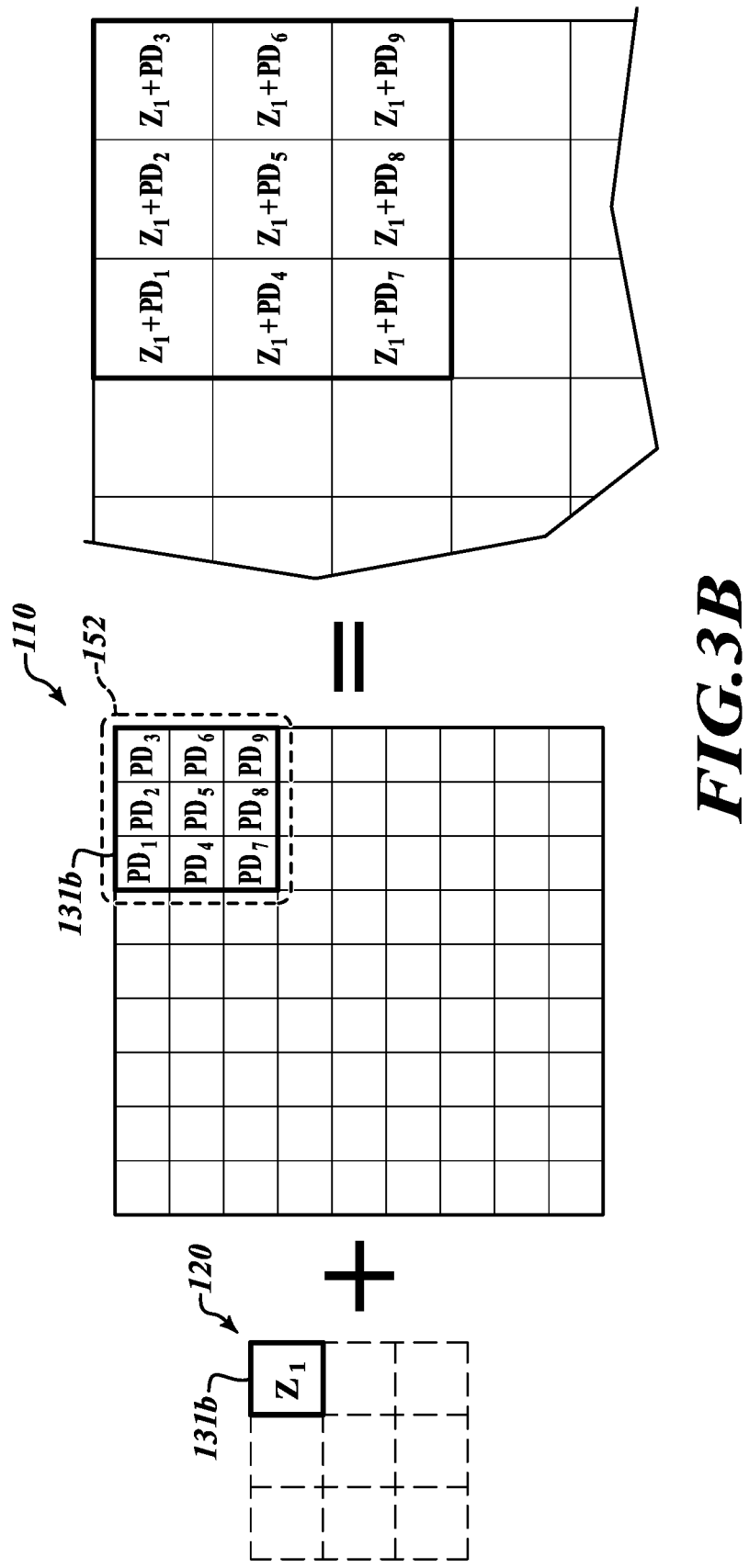
FIG. 3B is a representation of a combination of the output of the ranging sensor and the output of the image sensor, in particular the representation includes a specific zone and specific phase detect pixels after alignment using the patterned shapes reflected from the objects, in accordance with one embodiment of the present disclosure.

FIG. 3B is a representation of a combination of the output of the ranging sensor and the output of the image sensor. In particular, the representation includes a specific zone and specific phase detect pixels after alignment using the patterned shape reflected from the object, in accordance with one embodiment of the present disclosure.

FIG. 3B lays out how the combination process between the phase detect value pixels from the image sensor 110 (e.g., representative of an absolute depth information) and the distance measurement from the ranging sensor 170 (e.g., representative of an absolute distance information) is performed. As previously explained, in the example, the ranging sensor 170 has a 3×3 array of zones 131B and the image sensor 110 has a 9×9 array of pixels 151. In the figures, the size of the zone of the ranging sensor 170 has been illustrated as being smaller than the array of pixels of the image sensor 110. However, because the distance measurements of a zone, $Z_1$, is combined with the absolute phase detect value pixels of a subset of pixels, $P_1$, the actual or physical size of the zone and the actual size of the subset of pixels need not match each other. In other embodiments, however, as shown in the overlapping figures in the leftmost drawing of FIG. 4B, the size of the zones and the size of the pixels can be implemented to match each other.

Figure 4A:
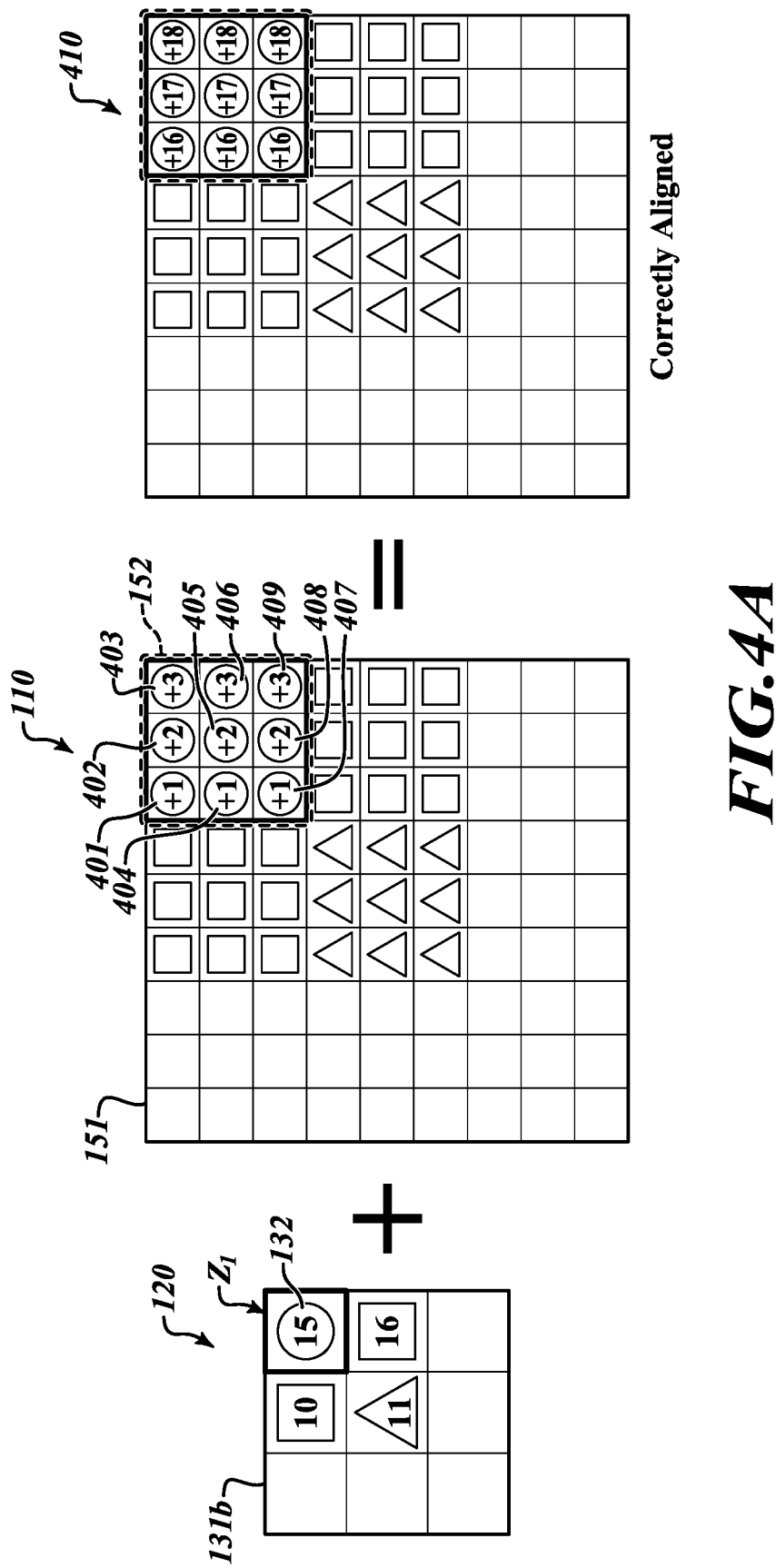
FIG. 4A is a representation of a method of combining distance information from the ranging sensor and the image sensor in a correctly aligned case, in accordance with one embodiment of the present disclosure.

Returning to FIG. 3B, a zone, $Z_1$, of the ranging sensor 170 has a corresponding size of the 3×3 subarray 152 of pixels 151 having phase detect pixel values $PD_1$ to $PD_9$. These phase detect pixel values are each associated with a value indicative of an absolute depth information. As shown in FIG. 4A, $PD_1$, $PD_4$, $PD_7$ indicates a depth value of +1, and $PD_2$, $PD_5$, $PD_8$ indicates a depth value of +2, and $PD_3$, $PD_6$, $PD_9$ indicates a depth value of +3.

In a perfectly aligned case where each zone having a certain patterned shape matches each corresponding subarray of pixels having the same patterned shape, the values of the zone and the pixels can be added to generate high resolution depth map information with accurate distance information. For example, as seen in FIG. 3B, now the total distance value assigned to each of the pixels corresponds to $Z_1+PD_1$, . . . , $Z_1+PD_9$, respectively. This can be further elaborated with actual distance and depth values with respect to FIG. 4A.

FIG. 4A is a representation of a method of combining distance information from the ranging sensor and the image sensor in a correctly aligned case, in accordance with one embodiment of the present disclosure.

As explained in connection with FIG. 3B, the distance measurement obtained in $Z_1$ of the ranging sensor 170 is combined with depth measurement obtained in the 3×3 subarray of pixels 151 of the image sensor 110 sharing the same circled patterned shapes. The distance measurement/value associated with the circle 132 in $Z_1$, 15 is added to the depth measurement/value +1 associated with the circle in 401 which produces an overall value of +16. Similar calculations are performed by adding the distance value 15 in the circle 132 in $Z_1$ to circles 402, 403, 404, 405, 406, 407, 408, and 409 in subarray 152 of pixels 151. When each of the circle shape in zone $Z_1$ of the ranging sensor 170 is correctly aligned with each of the circle shape in the subset of pixels $P_1$ of the image sensor 110, the overall value is calculated and output in 410.

Similar calculations are performed with relation to the other patterned shapes (e.g., triangle, square) to obtain the overall combined distance measurements in 410.

Figure 4B:
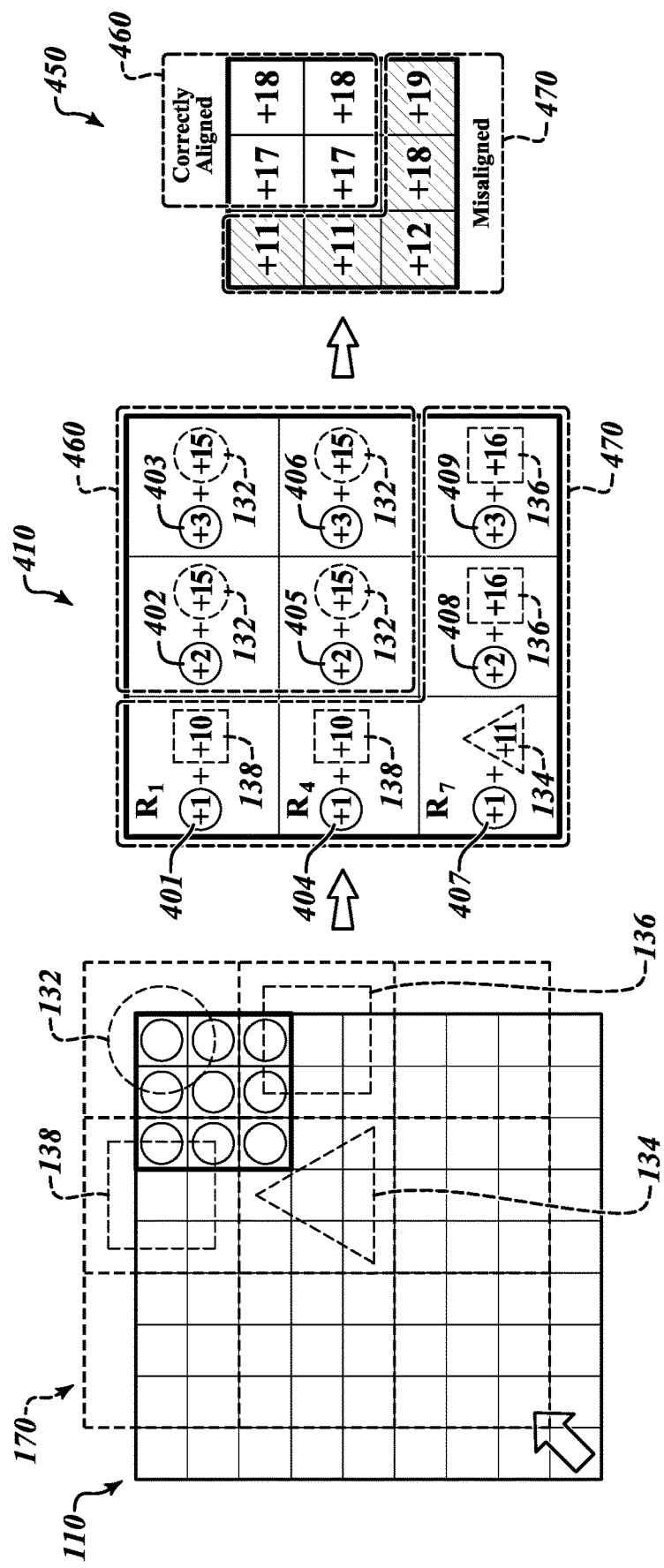
FIG. 4B is a representation of incorrectly aligned outputs of the ranging sensor and the image sensor, where some portion of the zone of the ranging sensor and some portion of the pixels of the image sensor overlap with different patterned shapes, in accordance with one embodiment of the present disclosure.

FIG. 4B is a representation of incorrectly aligned outputs of the ranging sensor and some portion of the pixels of the image sensor overlap with different patterned shapes, in accordance with one embodiment of the present disclosure.

The leftmost portion of the figure shows an overlap of the zones of the ranging sensor 170 and the pixels of the image sensor 110. The ranging sensor 170 is expressed in dotted lines to show that the zones of the ranging sensor 170 are misaligned with the pixels of the image sensor 110.

In the 3×3 representation 410, the values of the subarray of the pixels now combined with those of the zones show the sum of the misaligned result. For example, due to the misalignment by a certain amount (see the arrow indicating the misaligned amount and direction), the circle patterned shapes of zone 1 of the ranging sensor 170 are not added with all of the circle patterned shapes of the subpixels of the image sensor 110. That is, different kind of patterned shapes are combined with each other as a result of the misalignment. For example, portion 470 of the representation exhibits mixing circle shapes with square shapes and circle shapes with triangle shapes. However, in portion 460, the combined representation correctly illustrates adding circle shapes with circle shapes. This misalignment will cause a misrepresentation of the distance measurement of the object 180 as well as the depth measurement of the object 180. The misrepresentation can lead to a production of an inaccurate depth map. Accordingly, the amount of misalignment has to be accounted for and adjusted based on the patterned shapes of the zones and the subset of pixels.

Returning to the misaligned portion 470, a combined representation $R_1$ shows that a circle 401 having a depth value of +1 is added with a square 138 having a distance value of 10 to produce +11. Similarly, a combined representation $R_4$ shows that a circle 404 having a depth value of +1 is added with a square 138 having a distance value of 10 to produce +11. Similarly, a combined representation $R_7$ shows that a circle 407 having a depth value of +1 is added with a triangle 134 having a distance value of 11 to produce +12. The rest of the representation in the misaligned portion 470 can be added in a similar manner.

The correctly aligned portion 460 shows that a circle patterned shape of a ranging sensor 170 is added with a corresponding circle patterned shape of an image sensor 110. However, as shown in the final combined representation 450, the created depth map has both a misaligned portion 470 and a correctly aligned portion 460 which produces an inaccurate depth map information of the object 180. With an inaccurate depth map that is not based on calculating the same corresponding patterned shapes of the ranging sensor 170 and the image sensor 110, the combination of the distance and depth information would not be precise and the depth map produced based on these measurements would likely be distorted.

To solve this misalignment problem, the processor of the electronic device 105 receives the patterned shapes from each of the image sensor 110 and the ranging sensor 170. The processor compares, for example zone $Z_1$ of the ranging sensor 170 having a circle patterned shape with the subarray of pixels having the same circle patterned shape in the image sensor 110. In doing so, the processor applies a spatial mask to mask the rest of the zones not involved in the comparison operation. In this example, because the processor is sequentially comparing one zone of the ranging sensor 170 with a subarray of pixels of the image sensor 110, the correction alignment process may be slower even though it would require less memory. In other embodiments, the processor can compare one or more zones located diagonally with each other for the comparison operation. For example, the processor can mask the rest of the zones except for two zones located diagonally with each other. By comparing more than one zone with the subarray of pixels having the same patterned shapes in the image sensor 110, the processor can facilitate the comparison operation for finding a correct alignment. The one or more zones selected for the comparison operation does not have to be located diagonally with respect to each other and may be positioned in any suitable manner. For example, the two zones may be aligned in a vertical manner, or a horizontal manner. The number of zones to use for comparison and the number of zones to spatially mask the rest of the zones not used for comparison can be adjusted based on the balance of memory usage and speedy alignment. In one embodiment, the relationship between memory usage and alignment speed is in a tradeoff relationship and by using less memory, the correction alignment process may be performed slower by the processor. However, if more zones are used by using more memory, the correction alignment process may be performed faster by the processor because the processor is provided with more data points to work with.

In some embodiments, instead of using the aforementioned sequential comparison by the processor, the processor may execute the comparison operation by acquiring all the patterned shapes associated with the zones and the pixels and comparing in a parallel manner. This parallel comparison by the processor may take more memory but the correction alignment process may be performed faster.

When the alignment is correctly aligned as shown in FIG. 4A, the depth map information produced will have a high resolution depth map of the object 180. This is due to supplementing the features of the ranging sensor 170 which is capable of obtaining highly accurate distance measurement at a low resolution with the features of the image sensor 110 which is capable of obtaining high resolution image with relative depth information of the object 180.

Figure 5:
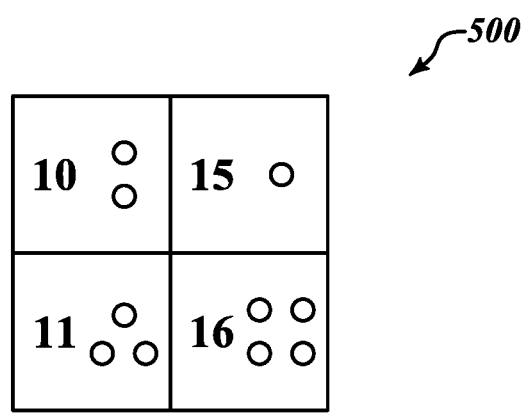
FIG. 5 is a representation of a ranging sensor using different patterned shapes, in accordance with one embodiment of the present disclosure.

FIG. 5 is a representation 500 of a ranging sensor using different patterned shapes, in accordance with one embodiment of the present disclosure.

In FIG. 5, an exemplary 2×2 zone of a ranging sensor 170 is used. The 2×2 zone has dotted circle pattern shapes. However, any kind of shapes can be used to create structured light using, for example, the VCSEL. By using a filter structure or a DOE having various kinds of shapes, structured light having the same various kinds of shapes can be produced. In FIG. 5, dotted circles have been used to detect the distance from the object. For example, a one-dotted circle pattern is indicative of a distance value 15. Similarly, a two-dotted circle pattern is indicative of a distance value 10. A three-dotted circle pattern is indicative of a distance value 11. Finally, a four-dotted circle pattern is indicative of a distance value 16. The same process of overlaying the same patterned shape of the image sensor 110 and the ranging sensor 170 is used to obtain an accurate depth map. Various shapes and sizes can be used by utilizing different kind of filters. The receiver 120 of the ranging sensor 170 and the receiver of the image sensor 110 can search and identify the specific patterned shape reflected from the object 180. The identified patterned shape is then analyzed by the processor of the electronic device 105 to obtain the distance information associated with the patterned shape in the same manner as previously described.

In one embodiment of the present disclosure, a method is provided that includes: forming a depth map for a field of view of a ranging sensor and an image sensor, the depth map having a plurality of areas. The forming includes: generating a pattern in the field of view from the ranging sensor; receiving a first reflected pattern and distance information with the ranging sensor; receiving a second reflected pattern and phase information with the image sensor; aligning the first reflected pattern with second reflected pattern; and calculating depth information for each area of the depth map by combining distance information from the ranging sensor with phase information from the image sensor after aligning the first reflected pattern with the second reflected pattern.

In one embodiment, generating the pattern includes emitting light from the ranging sensor, the pattern including a plurality of shapes.

In one embodiment, the first reflected pattern includes a plurality of shapes that correspond to the plurality of shapes from the pattern and the second reflected pattern includes a plurality of shapes that correspond to the plurality of shapes from the pattern.

In one embodiment, receiving the first reflected pattern and distance information with the ranging sensor includes capturing the distance information for a plurality of zones of the ranging sensor, each zone being associated with one of the shapes of the plurality of shapes of the first reflected pattern.

In one embodiment, receiving the second reflected pattern and phase information includes capturing an image having a plurality of pixels, a subset of the plurality of pixels being associated with one of the shapes of the plurality of shapes of the second reflected pattern.

In one embodiment, aligning the first reflected pattern with the second reflected pattern includes aligning a subset of the plurality of pixels associated with one of the shapes of the second reflected pattern with one of the zones of the plurality of zones associated with one of the shapes of the first reflected pattern.

In one embodiment, aligning includes matching a shape of the first reflected pattern with a shape of the second reflected pattern and calculating the depth information includes adding the distance information associated with the shape of the first reflected pattern to the phase information for each of the pixels in the subset of pixels associated with the shape of the second reflected pattern.

In another aspect of the present disclosure provides a device including a ranging sensor including, a light source; a patterned structure on the light source, the patterned structure having a plurality of shapes where adjacent shapes in the plurality of shapes are different from each other; and a receiver having a plurality of zones.

In one embodiment, the device further includes: a substrate, the ranging sensor being on the substrate; an image sensor on the substrate adjacent to the ranging sensor, the image sensor and the ranging sensor having an overlapping field of view.

In one embodiment, the ranging sensor, in operation, receives a first reflected pattern and a plurality of distance values and the image sensor, in operation captures an image having a plurality of pixels, the image including a second reflected pattern and phase information associated with each pixel of the plurality of pixels.

In one embodiment, the device further includes a processor coupled to the ranging sensor and the image sensor. The processor configured to: identify a first shape in the first reflected pattern that corresponds to a first shape of the plurality of shapes of the patterned structure; identify a first shape in the second reflected pattern that corresponds to the first shape of the plurality of shapes of the patterned structure; identify a distance value that corresponds to the first shape in the first reflected pattern; identify a subset of the plurality of pixels that corresponds to the first shape in the second reflected pattern; and combine the distance value with the phase information of each pixel of the subset of the plurality of pixels.

In one embodiment, the light source includes a vertical cavity surface emitting laser.

In one embodiment, the patterned structure includes a diffractive optical element.

In one embodiment, a size of the zone corresponds to a size of a subset of the one or more pixels.

In one embodiment, the ranging sensor includes a time of flight sensor.

Yet in another aspect of the present disclosure provides a system including: a ranging sensor that includes a light source configured to emit light; a patterned structure on the light source, having a plurality of shapes, wherein the patterned structure emits structured light upon filtering the emitted light from the light source, wherein the structured light includes the plurality of shapes; and a receiver having a plurality of zones, each zone receiving structured light associated with a selected shape of the plurality of shapes that is reflected from an object, wherein the receiver stores information for determining absolute distance information based on the received structured light.

The system further includes an image sensor that includes an array of pixels, the array of pixels including a plurality of subarrays. The subarrays are respectively associated with the shapes reflected from the object. The image sensor stores information for determining relative distance information based on the received structured light.

The system further includes a processor configured to: receive from the receiver of the ranging sensor, absolute distance information; receive from the image sensor, relative distance information; and generate a depth map of the object based on the absolute distance information and the relative distance information.

In one embodiment, adjacent shapes in the plurality of shapes of the patterned structure are different from each other.

In one embodiment, a size of each zone corresponds to a size of each subarrays of the array of pixels.

In one embodiment, the processor is further configured to: extract timing difference between the emitted structured light and the received structured light; and output the absolute and relative distance information based on the timing difference.

In one embodiment, the processor is further configured to: align the selected shape of the zone of the ranging senor and the selected shape of the subarrays of the image sensor; and combine the absolute distance information and relative distance information for each aligned zone and subarray for the selected shape.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    forming a depth map for a field of view of a ranging sensor and an image sensor, the depth map having a plurality of areas, the forming including:
    generating a pattern in the field of view from the ranging sensor;
    receiving a first reflected pattern and distance information with the ranging sensor;
    receiving a second reflected pattern and phase information with the image sensor;
    aligning the first reflected pattern with second reflected pattern; and
    calculating depth information for each area of the depth map by combining distance information from the ranging sensor with phase information from the image sensor after aligning the first reflected pattern with the second reflected pattern.

2. The method of claim 1, wherein generating the pattern includes emitting light from the ranging sensor, the pattern including a plurality of shapes.

3. The method of claim 2, wherein the first reflected pattern includes a plurality of shapes that correspond to the plurality of shapes from the pattern and the second reflected pattern includes a plurality of shapes that correspond to the plurality of shapes from the pattern.

4. The method of claim 3, wherein receiving the first reflected pattern and distance information with the ranging sensor includes capturing the distance information for a plurality of zones of the ranging sensor, each zone being associated with one of the shapes of the plurality of shapes of the first reflected pattern.

5. The method of claim 4, wherein receiving the second reflected pattern and phase information includes capturing an image having a plurality of pixels, a subset of the plurality of pixels being associated with one of the shapes of the plurality of shapes of the second reflected pattern.

6. The method of claim 5, wherein aligning the first reflected pattern with the second reflected pattern includes aligning a subset of the plurality of pixels associated with one of the shapes of the second reflected pattern with one of the zones of the plurality of zones associated with one of the shapes of the first reflected pattern.

7. The method of claim 5, wherein the aligning includes matching a shape of the first reflected pattern with a shape of the second reflected pattern and calculating the depth information includes adding the distance information associated with the shape of the first reflected pattern to the phase information for each of the pixels in the subset of pixels associated with the shape of the second reflected pattern.

8. A device, comprising:
an image sensor;
a ranging sensor including,
 a light source;
 a patterned structure on the light source, the patterned structure having a plurality of shapes where adjacent shapes in the plurality of shapes are different from each other,
wherein the ranging sensor, in operation, receives a first reflected pattern and a plurality of distance values and the image sensor, in operation captures an image having a plurality of pixels, the image including a second reflected pattern and phase information associated with each pixel of the plurality of pixels;
a receiver having a plurality of zones;
a processor coupled to the ranging sensor and the image sensor, the processor configured to:
 identify a first shape in the first reflected pattern that corresponds to a first shape of the plurality of shapes of the patterned structure;
 identify a first shape in the second reflected pattern that corresponds to the first shape of the plurality of shapes of the patterned structure;
 identify a distance value that corresponds to the first shape in the first reflected pattern;
 identify a subset of the plurality of pixels that corresponds to the first shape in the second reflected pattern; and
 combine the distance value with the phase information of each pixel of the subset of the plurality of pixels.

9. The device of claim 8, further comprising:
a substrate, the ranging sensor being on the substrate;
wherein the image sensor is on the substrate adjacent to the ranging sensor, the image sensor and the ranging sensor having an overlapping field of view.

10. The device of claim 8, wherein the light source includes a vertical cavity surface emitting laser.

11. The device of claim 8, wherein the patterned structure includes a diffractive optical element.

12. The device of claim 8, wherein a size of the zone corresponds to a size of a subset of the one or more pixels.

13. The device of claim 8, wherein the ranging sensor includes a time of flight sensor.

14. A system, comprising:
a ranging sensor including:
 a light source configured to emit light;
 a patterned structure on the light source, having a plurality of shapes, wherein the patterned structure emits structured light upon filtering the emitted light from the light source, wherein the structured light includes the plurality of shapes; and
 a receiver having a plurality of zones, each zone receiving structured light associated with a selected shape of the plurality of shapes that is reflected from an object, wherein the receiver stores information for determining absolute distance information based on the received structured light,
an image sensor including:
 an array of pixels, the array of pixels including a plurality of subarrays, wherein the subarrays are respectively associated with the shapes reflected from the object,
 wherein the image sensor stores information for determining relative distance information based on the received structured light,
a processor configured to:
 receive from the receiver of the ranging sensor, absolute distance information;
 receive from the image sensor, relative distance information; and
 generate a depth map of the object based on the absolute distance information and the relative distance information.

15. The system of claim 14, wherein adjacent shapes in the plurality of shapes of the patterned structure are different from each other.

16. The system of claim 14, wherein a size of each zone corresponds to a size of each subarrays of the array of pixels.

17. The system of claim 14, wherein the processor is further configured to:
extract timing difference between the emitted structured light and the received structured light; and
output the absolute and relative distance information based on the timing difference.

18. The system of claim 17, wherein the processor is further configured to:
align the selected shape of the zone of the ranging senor and the selected shape of the subarrays of the image sensor; and
combine the absolute distance information and relative distance information for each aligned zone and subarray for the selected shape.

* * * * *